**3,061,636
A-NOR-B-HOMO-ESTRANES AND THEIR PROCESS
OF PREPARATION**
Georges Muller, Nogent-sur-Marne, and Andre Poittevin,
Les Lilas, France, assignors, by mesne assignments, to
Roussel-UCLAF, S.A., Paris, France, a corporation of
France
No Drawing. Filed Nov. 1, 1961, Ser. No. 149,221
Claims priority, application France Apr. 10, 1961
12 Claims. (Cl. 260—488)

The present invention relates to new A-nor-B-homoestranes and their process of preparation. It particularly relates to the A-nor-B-homo steroids carrying a methyl or hydrogen substituent in the 5ξ-position. It more particularly includes the A-nor-B-homo-10ξ-estrane-3,6-diones of the formula:

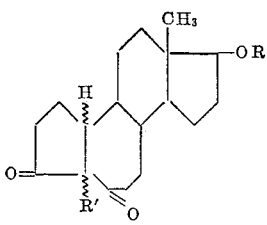

wherein R represents a radical selected from the group consisting of hydrogen and the acyl radical of an organic carboxylic acid having from 2 to 7 carbon atoms and R' represents a radical selected from the group consisting of hydrogen and lower alkyl, with the proviso that when R' represents hydrogen the diketone is in one of its $\Delta^{3(5)}$ or $\Delta^{5(6)}$ enolic forms.

In copending commonly-assigned United States patent application Serial No. 149,223, filed concurrently herewith, certain A-nor-B-homo-$\Delta^{5(10)}$-estrenes are described. These estrenes have an anabolic action while being almost devoid of an androgenic action.

The new A-nor-B-homo-estranes, the object of the present invention, differ from the preceding compounds in that the A and B rings of these steroids are completely saturated and that they may carry a lower alkyl substituent such as the methyl group in the 5 position. The spatial orientation of either the hydrogen or lower alkyl group has not yet been determined. Saturation of the A and B rings on one hand and, optionally, introduction of the methyl or other lower alkyl group at the junction of these two rings on the other hand, noticeably modifies the physiological action of these compounds, whose hormonal properties are distinct from those of the unsaturated compounds. The 5ξ-lower alkyl-17β-acyloxy-A-nor-B-homo-10ξ-estrane-3,6-diones, similarly as the 17β-acyloxy-A-nor-B-homo-5ξ,10ξ-estrane-3,6-diones, as well as the 17β-hydroxy analogs, possess remarkable hormonal properties and particularly an androgenic action equal to or superior to that of testosterone.

It is an object of the present invention to obtain A-nor-B-homo-10-ξ-estrane-3,6-diones of the formula:

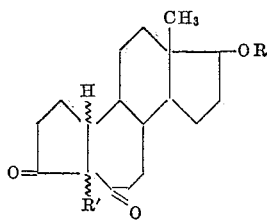

wherein R represents a radical selected from the group consisting of hydrogen and the acyl radical of an organic carboxylic acid having from 2 to 7 carbon atoms and R' represents a radical selected from the group consisting of hydrogen and lower alkyl, with the proviso that when R' represents hydrogen, the diketone is in one of its $\Delta^{3(5)}$ or $\Delta^{5(6)}$ enolic forms.

A further object of the invention is the obtention of:

17β - acetoxy-A-nor-B-homo-5ξ,10ξ-estrane-3,6-dione in its enolic A form having a melting point of 168° C., a specific rotation $[\alpha]_D^{20} = +50°$ (c.=0.5% in chloroform), and an ultra-violet spectrum in ethanol:

$$\lambda_{max.} = 290 \text{ m}\mu, \quad E_{1 \text{ cm.}}^{1\%} = 263$$

17β-acetoxy-A-nor-B-homo-5ξ,10ξ-estrane-3,6-dione in its enolic B form having a melting point of around 240° C. and an ultra-violet spectrum in ethanol:

$$\lambda_{max.} = 302 \text{ m}\mu, \quad E_{1 \text{ cm.}}^{1\%} = 293$$

The mono-enol acetate of the enolic form A of 17β-acetoxy-A-nor-B-homo-5ξ,10ξ-estrane-3,6-dione form having a melting point of 118° C., a specific rotation $[\alpha]_D^{20} = 0° \pm 4°$ (c.=0.5% in chloroform), and an infrared spectrum showing a band at 1210 cm.$^{-1}$ and at 1200 cm.$^{-1}$ in accord with an enol acetate group and a band at 1765 cm.$^{-1}$ in accord with a carbonyl group.

A-nor-B-homo-5ξ,10ξ-estrane-17β-ol - 3,6 - dione in its enolic form having a melting point of 138–140° C. and an infra-red spectrum showing bands at 1649 cm.$^{-1}$ and at 1610 cm.$^{-1}$ in accord with two carbonyl groups and a band in accord with a hydroxyl group.

17β - acetoxy-5ξ-methyl-A-nor-B-homo-10ξ-estrane-3,6-dione having a melting point of 164° C., a specific rotation $[\alpha]_D^{20} = +9°$ (c.=0.5% in chloroform) and an infra-red spectrum showing bands at 1740 cm.$^{-1}$ and at 1245 cm.$^{-1}$ in accord with an acetate group, bands at 1758 cm.$^{-1}$ and at 1699 cm.$^{-1}$ in accord with two carbonyl groups and no band in accord with a hydroxyl group.

A still further object of the invention is the development of a process of producing said A-nor-B-homo-10ξ-estrane-3,6-diones.

Another object of the invention is the obtention of said A-nor-B-homo-10ξ-estrane-3,6-diones having an improved androgenic activity and anabolic activity.

These and other objects of the invention will become more apparent as the description thereof proceeds.

The compounds of the invention are A-nor-B-homo-10ξ-estrane-3,6-diones of the formula:

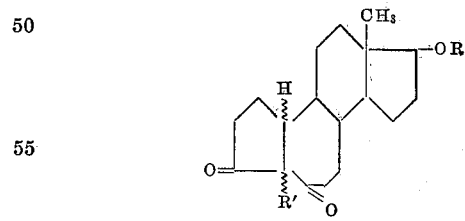

wherein R represents a radical selected from the group consisting of hydrogen and the acyl radical of an organic carboxylic acid having from 2 to 7 carbon atoms and R' represents a radical selected from the group consisting of hydrogen and lower alkyl, with the proviso that when R' represents hydrogen, the diketone is in one of its $\Delta^{3(5)}$ or $\Delta^{5(6)}$ enolic forms.

The spatial orientation of either the hydrogen or lower alkyl group in the 5 position or the hydrogen in the 10 position has not yet been determined.

When R' represents hydrogen, the A-norm-B-homo-5ξ, 10ξ-estrane-3,6-diones do not exist in fact in the form of β-diketones. They enolize completely into two tautomeric forms, both of which have been isolated. One of these forms is denominated herein as enolic form A and is obtained directly by the selective reduction of the 5(10) double bond. By heating enolic form A with an aluminum lower alkanolate such as aluminum isopropylate in the presence of an inert organic solvent such as the lower alkanol corresponding to the aluminum lower alkanolate, it is transposed into the other enolic form B. Inversely, by treatment with sodium hydroxide, enolic form B reverts to enolic form A.

The two enolic forms A and B are strongly chelated by a hydrogen bond in such a manner that the infra-red spectrum does not show a hydroxyl band.

The exact structure of each of the two forms can not be determined precisely.

Among the organic carboxylic acids having from 2 to 7 carbon atoms which may be employed as the acyloxy radical in the 17β position are preferentially lower alkanoic acids such as acetic, propionic, etc. However, other organic carboxylic acids may be employed, such as benzoic acid and substituted benzoic acids, for example, 3,5-dinitrobenzoic acid; alkanedioic acids, for example succinic acid; lactic acid; citric acid; hexahydrobenzoic acid; etc.

The process of preparation of the A-nor-B-homo-10ξ-estrane-3,6-diones of the invention comprises principally the following steps:

(a) Selective saturation of the double bond in the 5(10) position of a 17-acyloxy-A-nor-B-homo-Δ$^{5(10)}$-estrene-3,6-dione;

(b) Introduction of a methyl or other lower alkyl group by means of an alkylating agent such as a lower alkyl halide in the presence of a basic condensation agent.

The following flow diagrams of Table I and Table II show the course of the reactions in the preparation of the compounds of the invention. Table I shows the preparation of the A-nor-B-homo-10ξ-estrane-3,6-diones of the invention and Table II illustrates a subsidiary reaction preparing the enol acetates of the A-nor-B-homo-5ξ,10ξ-estrane-3,6-diones. In the tables R and R' have the meanings assigned above.

TABLE I

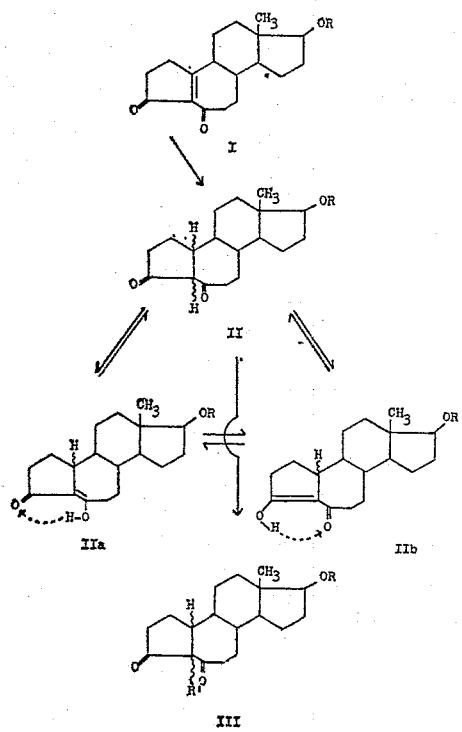

TABLE II

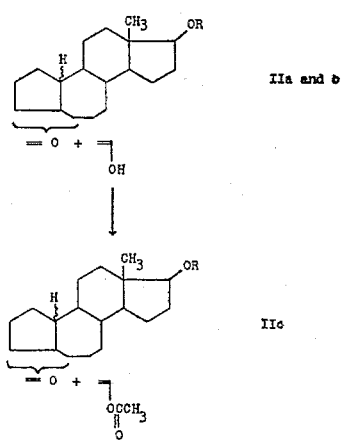

17β-acetoxy-5ξ-methyl-A-nor-B-homo-10ξ-estrane-3,6-dione (compound III, with R=COCH$_3$) is prepared following the reaction scheme of Table I by a process which consists essentially in subjecting 17β-acetoxy-A-nor-B-homo-Δ$^{5(10)}$-estrene-3,6-dione to the selective action of an alkali metal mixed hydride such as potassium borohydride as a hydrogenation agent in the presence of a low molecular weight hydroxylated organic solvent, preferably a lower alkanol such as methanol, in an acidic media, preferably a lower alkanoic acid such as acetic acid, at a temperature between about 5° C. and about 25° C. in order to form 17β-acetoxy-A-nor-B-homo-5ξ-estrane-3,6-dione (compound II, with R=COCH$_3$) in the form of its A enolic form and in causing this latter to react with a methyl halide, preferably an iodide, in the presence of a basic condensation agent such as an alkali metal lower alkanolate, preferably potassium t-butylate at reflux temperatures in order to obtain the desired 17β-acetoxy-5ξ-methyl-A-nor-B-homo-10ξ-estrane-3,6-dione (compound III, with R=COCH$_3$).

The condensation reaction is equally effective when the 17β-acetoxy-A-nor-B-homo-5ξ,10ξ-estrane-3,6-dione is employed in its B enolic form. The reactions are also readily performed when R represents other acyl radicals of organic carboxylic acids having from two to seven carbon atoms. When starting with the 17β-acetoxy compound (compound I, with R=COCH$_3$), it is also possible to effect the selective hydrogenation step, and thereafter saponify the ester by customary processes to obtain A-nor-B-homo-5ξ,10ξ-estrane-17β-ol-3,6-dione (compound II, with R=H) in its A enolic form which may be esterified with an organic carboxylic acid having from two to seven carbon atoms by conventional methods, in order to obtain compound II where R is an acyl radical. Likewise, 17β-acetoxy-5ξ-methyl-A-nor-B-homo-10ξ-estrane-3,6-dione may be saponified and re-esterified.

The enolic forms of the 17β-acyloxy-A-nor-B-homo-5ξ,10ξ-estrane-3,6-dione may also be esterified by conventional methods, such as reaction with an acid anhydride or an acid chloride in a basic organic media such as pyridine to obtain the corresponding enol acylates. Any organic carboxylic acid having from two to seven carbon atoms, as listed above, may be employed in the form of its acid anhydride or acid chloride, although acetic acid anhydride in pyridine is preferable.

The starting compound, 17β-acyloxy-A-nor-B-homo-Δ$^{5(10)}$-estrene-3,6-dione is prepared according to the process described in copending, commonly-assigned U.S. patent application Serial No. 149,223, filed concurrently herewith by subjecting a 17β-acyloxy-Δ$^{5(10)}$-estrene-3-one to ozonization, reducing the ozonization product to obtain a 17β-acyloxy-5,10-seco-estrane-3,5,10-trione, and cyclizing this latter product by heating in an acidic media to recover said 17β-acyloxy-A-nor-B-homo-Δ$^{5(10)}$-estrene-3,6-dione.

The following examples are given as indicative and enable a better comprehension of the invention. It is obvious, however, to one skilled in the art that other expedients may be employed.

The temperatures are indicated in degrees centrigrade. The melting points are determined on the Kofler block and are the instantaneous melting points.

EXAMPLE I

*Preparation of 17β - Acetoxy - A - Nor - B - Homo - 5ξ,10ξ-Estrane-3,6-Dione (Enolic Form A) (Compound II, With R=COCH₃)*

2 g. of 17β-acetoxy-A-nor-B-homo-$\Delta^{5(10)}$-estrene-3,6-dione (compound I, with R=COCH₃) were introduced into a small conical flask. Then 20 cc. of methanol and 2 cc. of acetic acid were introduced, forming a suspension. 1 g. of potassium borohydride was added to this suspension over a period of fifteen minutes while agitating and maintaining the temperature in the neighborhood of +10° C. The agitation was continued for a further fifteen minute period at the same temperature. Then the mixture was diluted with 100 cc. of water. The aqueous solution was extracted with methylene chloride and the methylene chloride phase was decanted. This phase was washed with water, dried over magnesium sulfate, and distilled to dryness. The dry residue was redissolved in 20 cc. of isopropyl ether. On standing, 17β-acetoxy-A-nor-B-homo-5ξ,10ξ-estrane-3,6-dione crystallized. 1.372 g., being a yield of 68% of the theoretical, of a product melting at 166° C. were obtained. A new crystallization from isopropyl ether raised the melting point to 168° C. The product melting at 168° C. has been arbitrarily designated as the enolic form A.

17β - acetoxy - A - nor - B - homo - 5ξ,10ξ - estrane - 3,6-dione (enolic form A) occurred in the form of prismatic needles. It was very soluble in acetone, benzene and chloroform, and soluble in alcohol and ether.

It had the following physical constants: melting point 168° C., specific rotation $[\alpha]_D^{20}=+50°$ C. (c.=0.5% in chloroform).

Infra-red spectrum:
  Absence of an alcoholic hydroxyl group;
  Presence of an acetate band at 1740 cm.⁻¹;
  Presence of two ketone bands at 1649 cm.⁻¹ and 1610 cm.⁻¹.

Ultra-violet spectrum:

$\lambda_{max.}$ in ethanol=290 m$\mu$, $E_{1\,cm.}^{1\%}$=263

$\lambda_{max.}$ in ethanol having N/10 sodium hydroxide=310 m$\mu$, $E_{1\,cm.}^{1\%}$=461

The bathochrome effect was due to enolization of one of the ketone functions.

*Anaylsis.*—C₂₀H₂₈O₄; molecular weight=332.42. Calculated: C, 72.26%; H, 8.49%; O, 19.25%. Found: C, 72.5; H, 8.3; O, 19.1.

This compound is new.

The starting compound I was obtained according to the process described in copending, commonly-assigned United States patent application Serial No. 149,223, filed concurrently herewith.

EXAMPLE II

*Preparation of the Mono-Enol Actate of 17β-Acetoxy-A-Nor-B-Homo-5ξ,10ξ-Estrane-3,6-Dione (Compound IIc)*

1 g. of 17β-acetoxy-A-nor-B-homo-5ξ,10ξ-estrane-3,6-dione (enolic form A) were dissolved in 2 cc. of pyridine and 1.2 cc. of acetic acid anhydride. The reaction mixture was allowed to stand for sixteen hours at the temperature of the laboratory. The mixture was added to water and extracted with methylene chloride. The methylene chloride phase was separated, washed with normal sulfuric acid, then with water, dried over magnesium sulfate and evaporated to dryness.

The dry residue was taken up in a mixture of isopropyl ether and petroleum ether from which the mono-enol acetate crystallized on standing.

772 mgm. of of the mono-enol acetate were thus separated, melting at 116–118° C. A recrystallization from isopropyl ether brought the melting point of the product to 118° C.

The mono-enol acetate of the enolic form A of 17β-acetoxy - A - nor-B-homo - 5ξ,10ξ - estrane - 3,6 - dione occurred in the form of prismatic needles, and was very soluble in acetone, benzene, chloroform and alcohol, and soluble in ether.

It possessed the following physical constants: melting point 118° C., specific rotation $[\alpha]_D^{20}=0°\pm4°$ (c.=0.5% in chloroform).

Infrared spectrum:
  Presence of an acetate band;
  Presence of a carbonyl band at 1765 cm.⁻¹;
  Presence of a band at 1210 cm.⁻¹ and 1200 cm.⁻¹ in accordance with an enol acetate structure:

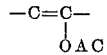

EXAMPLE III

*Preparation of A-Nor-B-Homo-5ξ,10ξ-Estrane-17β-Ol-3,6-Dione (Compound II, With R=H)*

1 g. of 17β-acetoxy-A-nor-B-homo-5ξ,10ξ-estrane-3,6-dione (enolic form A) was placed in suspension at the temperature of the laboratory in 5 cc. of a normal methanolic solution of potassium hydroxide. The product dissolved completely in fifteen minutes. The solution was allowed to stand for a period of four hours at room temperature. The reaction mixture was then acidified to a pH of 1 by addition of 7 N sulfuric acid, diluted with water and extracted with methylene chloride. The methylene chloride phase was decanted, washed with water, dried over magnesium sulfate, then distilled to dryness.

The residue was redissolved in 15 cc. of isopropyl ether and allowed to stand. 667 mgm. of A-nor-B-homo-5ξ,10ξ-estrane-17β-ol-3,6-dione in its enolic form were recovered, being a yield of 75% of theoretical.

The product melted at 138–140° C.

Infra-red spectrum:
  Presence of two carbonyl bands at 1649 cm.⁻¹ and 1610 cm.⁻¹;
  Presence of a hydroxyl group.

EXAMPLE IV

*Preparation of 17β-Acetoxy-A-Nor-B-Homo-5ξ,10ξ-Estrane-3,6-Dione (Enolic Form B) (Compound II, With R=COCH₃)*

500 mgm. of 17β-acetoxy-A-nor-B-homo-5ξ,10ξ-estrane-3,61-dione (enolic form A) were dissolved in 20 cc. of isopropanol. 200 mgm. of aluminum isopropylate were added. The mixture was distilled at a rate sufficient to remove 15 cc. of solvent over a period of thirty minutes. The remainder of the solution was cooled, diluted with water, and acidified to a pH of 1 with a normal solution of sulphuric acid. The aqueous solution was extracted with methylene chloride. The methylene chloride phase was separated and washed with water, dried over magnesium sulfate, and evaporated to dryness. The residue was taken up by a mixture of ether and petroleum ether from which the compound crystallized. 190 mgm. of 17β-acetoxy-A-nor-B-homo-5ξ,10ξ-estrane-3,6 - dione (enolic form B) were thus obtained having a melting point of about 240° C. and presenting the following constants:

Infra-red spectrum:
  Absence of the hydroxyl group;
  Absence of enolic form A;
  Presence of an acetate band.

Ultra-violet spectrum:
  In ethanol:

$$\gamma_{max.} = 302 \text{ m}\mu \quad E_{1\text{ cm.}}^{1\%} = 291$$

$$\text{inflexion} = 320 \text{ m}\mu \quad E_{1\text{ cm.}}^{1\%} = 204$$

In a solution of hydrochloric acid in ethanol:

$$\lambda_{max.} = 301 \text{ m}\mu \quad E_{1\text{ cm.}}^{1\%} = 278$$

In a solution of sodium hydroxide in ethanol:

$$\lambda_{max.} = 308\text{--}309 \text{ m}\mu \quad E_{1\text{ cm.}}^{1\%} = 445$$

EXAMPLE V

*Preparation of 17β-Acetoxy-5ξ-Methyl-A-Nor-Homo-10ξ-Estrane-3,6-Dione (Compound III, With R=COCH₃)*

800 mgm. of 17β - acetoxy-A-nor-B-homo-5ξ,10ξ-estrane-3,6-dione (enolic form A) were dissolved in 1.6 cc. of methyl iodide and 4 cc. of a normal solution of potassium t-butylate in t-butanol were added to the solution. The mixture was heated to reflux for a period of thirty minutes, then allowed to cool. Crushed ice was then added to the reaction mixture and the mixture was extracted with methylene chloride. The methylene chloride phase was separated, washed with water, dried over magnesium sulfate, and brought to dryness.

The dry residue was redissolved in 8 cc. of isopropyl ether. On standing, 370 mgm. of a yellow product melting at 162° C. crystallized.

The raw product was purified by taking up in 30 cc. of ether and passing through silica gel (Davison). The ethereal solution was brought to dryness. The dry residue was redissolved in a minimum of isopropyl ether. On standing, 254 mgm of 17β-acetoxy-5ξ-methyl-A-nor-B-homo-10ξ-estrane-3,6-dione (compound III) melting at 164° C. were obtained. 17β-acetoxy-5ξ-methyl-A-nor-B-homo-10ξ-estrane-3,6-dione occurred in the form of colorless elongated prisms and was very soluble in acetone, benzene, chloroform and alcohol; soluble in ether and insoluble in water. It presented the following physical constants: melting point 164° C., specific rotation $[\alpha]_D^{20} = +9°$ (c.=0.5% in chloroform).

Infra-red spectrum:
  Absence of hydroxyl group;
  Presence of two acetate bands at 1740 and 1245 cm.⁻¹;
  Presence of two carbonyl bands at 1758 and 1699 cm.⁻¹.

*Analysis.*—$C_{21}H_{30}O_4$; molecular weight=346.45. Calculated: C, 72.80%; H, 8.73%. Found: C, 73.0; H, 8.5.

Chromatographic analysis on Whatman No. 1 paper and resolution by a solution of m-dinitrobenzene confirmed the homogeneity of the product.

This compound is not described in the literature.

The methylation reaction of the example operated on the enolic form A of the A-nor-B-homo-5ξ,10ξ-estrane-3,6-dione and could also and under the same conditions be carried out on the tautomeric enolic form B of the same compound.

The products of the invention are endowed with interesting pharmacological properties as has been previously indicated. They possess particularly an androgenic and anabolic action. They possess also a far from negligible progestomimetic action.

Pharamacological studies:
  (A) Study of the activity of 17β-acetoxy-A-nor-B-homo-5ξ,10ξ-estrane-3,6-dione (enolic form A).
    (a) Determination of androgenic and anabolic activity.

The tests were made according to the technique of Hershberger, Proc. Soc. Exp. Biol. Med., 1953, 83, 175, slightly modified. They consisted of a daily administration by subcutaneous injection of the compound being studied in castrated male rats of the age of 3½ weeks. The rats were treated, starting the next day after castration, for a period of 10 days, then sacrificed the 11th day, 22 to 26 hours after their last injection. The animals were autopsied after their sacrifice and the interested organs were separated and weighed; particularly the kidneys and the lifter muscle of the anus (levator ani) for the study of the myo-tropic and anabolic action, as well as the ventral prostate and the seminal vesicles for the study of simultaneous androgenic action.

The 17β-acetoxy-A-nor-B-homo-5ξ,10ξ-estrane-3,6-dione (enolic form A) was injected subcutaneously at a dose of 83γ per rat and per day and the results obtained are given in the following table:

*Table III*

| Treatment | Daily Dose, gamma | Duration of Treatment, days | Body Weight in grams | | Seminal Vesicles, mg. | Ventral Prostate, mg. | Fresh Levator Ani, mg. | Rf | Rs | Lf | Ls | Ith |
|---|---|---|---|---|---|---|---|---|---|---|---|---|
| | | | Initial | Final | | | | | | | | |
| Control | | | 46 | 87 | 5.7 | 6.6 | 14.2 | 5.2 | 1.1 | 0.16 | 0.05 | |
| Testosterone acetate | 82.5 | 10 | 48 | 79 | 198 | 146 | 39.1 | 5.4 | 1.2 | 0.49 | 0.10 | 10.0 |
| Nortestosterone acetate | 79 | 10 | 48 | 83 | 65 | 98 | 49 | 5.4 | 1.3 | 0.59 | 0.13 | 0.38 |
| 17β-acetoxy-A-nor-B-homo-5ξ,10ξ - estrane - 3,6 - dione (enolic form A) | 83 | 10 | 48 | 78 | 185 | 148 | 48.5 | 5.5 | 1.2 | 0.61 | 0.12 | 0.24 |
| | | | 46 | 81 | 208 | 134 | 53 | 5.6 | 1.2 | 0.65 | 0.16 | 0.30 |
| | | | 46 | 73 | 189 | 124 | 54 | 5.9 | 1.2 | 0.73 | 0.20 | 0.33 |
| | | | 48 | 83 | 207 | 145 | 59 | 5.6 | 1.3 | 0.71 | 0.16 | 0.32 |
| Mean | | | 47 | 79 | 197 | 138 | 53.6 | 5.65 | 1.22 | 0.675 | 0.16 | 0.30 |

In this Table III, as in the subsequent Table IV, the symbols below represent:

$$Rf = \frac{\text{Weight of fresh kidney} \times 1{,}000}{\text{Body weight}}$$

$$Rs = \frac{\text{Weight of dry kidney} \times 1{,}000}{\text{Body weight}}$$

$$Lf = \frac{\text{Weight of fresh levator ani} \times 1{,}000}{\text{Body weight}}$$

$$Ls = \frac{\text{Weight of levator ani dried} \times 1{,}000}{\text{Body weight}}$$

$$Ith = \frac{\text{Weight of treated levator ani-weight of levator ani of the control}}{\text{Weight of treated prostate-weight of prostate of the control}}$$

As shown, the androgenic activity of the said compound measured by the weight of the seminal vesicles was about three times that of nortestosterone acetate at equal molecular dosages and determined on the weight of the ventral prostate about 50 percent superior to that of nortestosterone acetate. The androgenic activity was practically identical to that of testosterone acetate. The anabolic action, both myotropic and renotropic, was superior to that of nortestosterone acetate.

(b) Test on progestomimetic activity.

The progestomimetic activity of 17β-acetoxy-A-nor-B-5ξ,10ξ-estrane-3,6-dione (enolic form A) was determined by the Clauberg test, effected on rabbits previously sensitized by administration of folliculine.

1.66 mg. were injected subcutaneously each day for a period of 5 days. The animals were sacrificed the 6th day and presented on autopsy the lacy proliferation characteristic for endometriosis. All the rabbits thus treated presented such a structure in extremely developed form.

In the same conditions, nortestosterone acetate on an equimolecular weight basis gave only a sketch of lacework.

(c) Test of estrogenic activity.

(1) The administration by subcutaneous methods of 83γ of 17β-acetoxy-A-nor-B-homo-5ξ,10ξ-estrane-3,6-dione (enolic form A) daily for a period of 10 days to castrated female rats produced for 50% of the animals a vaginal mucification of the lactation type and for 50% a diestrus.

(2) The administration by subcutaneous methods of 242γ per day for a period of 10 days of 17β-acetoxy-A-nor-B-homo-5ξ,10ξ-estrane-3,6-dione (enolic form A) causes keratinization of the vagina in the rat with a bi- or pluristratified aspect, partially mucified and infiltrated with polynuclear cells.

17β-acetoxy-A-nor-B-homo-5ξ,10ξ-estrane - 3,6 - dione (enolic form A) possessed thus a slight estrogenic activity.

(d) Determination of toxicity.

Tests on toxicity were made on lots of mice of the Rockland strain weighing between 18 and 22 gm. 17β-acetoxy-A-nor-B-homo-5ξ,10ξ-estrane-3,6 - dione (enolic form A) was placed in solution in olive oil at a concentration of 5 mg. per cc. It was injected subcutaneously to a group of 10 mice in a volume of 0.01 cc. per gm. of mouse, being a dose of 50 mg./kg. The animals were held under observation for a period of 8 days. No mortality nor symptom of intoxication was observed.

The product was thus devoid of toxicity at a dose of 50 mg./kg.

(B) Study of the activity of 17β-acetoxy-A-nor-B-homo-5ξ,10ξ-estrane-3,6-dione (enolic acetate of enolic form A).

(a) Determination of androgenic and anabolic activity.

The tests were made according to the Hershberger technique previously described. 17β - acetoxy-A-nor-B-homo-5ξ,10ξ-estrane-3,6-dion (enolic acetate of enolic form A) was injected by subcutaneous methods for a period of 10 days in castrated male rats at a dose of 93γ per day.

Table IV shows the results obtained.

The remainder of the compounds of the formula:

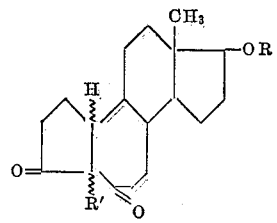

where R and R' have the previously assigned values have comparable physiological activities.

The above examples are illustrative of the invention. They are not, however, to be deemed as limitive. It is obvious to one skilled in the art that other equivalent techniques may be employed without departing from the body of the invention and the scope of the appended claims.

We claim:

1. A-nor-B-homo-10ξ-estrane-3,6-diones of the formula:

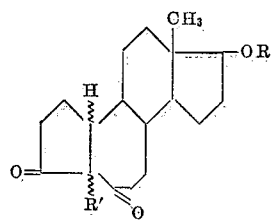

wherein R represents a radical selected from the group consisting of hydrogen and the acyl radical of an organic hydrocarbon carboxylic acid having from 2 to 7 carbon atoms and R' represents a radical selected from the group consisting of hydrogen and lower alkyl, with the proviso that when R' represents hydrogen, the diketone is in a tautomeric form selected from the group consisting of the $\Delta^{3(5)}$ enol and the $\Delta^{5(6)}$ enol.

TABLE IV

| Treatment | Daily Dose, γ | Duration of Treatment, days | Body Weight in grams | | Seminal Vesicles, mg. | Ventral Prostate, mg. | Fresh Levator Ani, mg. | Rf | Rs | Lf | Ls | Ith |
|---|---|---|---|---|---|---|---|---|---|---|---|---|
| | | | Initial | Final | | | | | | | | |
| Control | | | 46 | 87 | 5.7 | 6.6 | 14.2 | 5.2 | 1.1 | 0.16 | 0.05 | |
| Nortestosterone acetate | 79 | 10 | 48 | 83 | 65 | 98 | 49 | 5.4 | 1.3 | 0.59 | 0.13 | 0.38 |
| The enolic acetate of 17β-acetoxy-A-nor-B-homo-5ξ,10ξ-estrane - 3,6 - dione (enolic form A) | 93 | 10 | 44 | 68 | 220 | 186 | 55 | 5.4 | 1.2 | 0.81 | 0.16 | 0.22 |

As shown, the enolic acetate manifested an androgenic activity superior to that of nortestosterone acetate while having the same myotropic activity.

(b) Determination of the toxicity.

The tests of acute toxicity were made on mice of the Rockland strain weighing between 18 and 22 gm. The enolic acetate of 17β - acetoxy-A-nor-B-homo - 5ξ,10ξ-estrane-3,6-dione (enolic form A) was placed in solution in olive oil at a concentration of 5 mg. per cc. It was injected subcutaneously at a dose of 50 mg./kg., being a volume of 0.01 cc. per gm. of mice.

The animals were held in observation for a period of one week. No symptom of intoxication nor mortality revealed itself. The compound was thus devoid of toxicity at a dose of 50 mg./kg.

2. An enolic A-nor-B-homo-5ξ,10ξ-estrane-3,6-dione of the formula:

wherein R represents a radical selected from the group consisting of hydrogen and the acyl radical of an organic hydrocarbon carboxylic acid having from 2 to 7 carbon atoms, selected from the group consisting of the Δ³⁽⁵⁾ enol and the Δ⁵⁽⁶⁾ enol.

3. An enol ester of an organic hydrocarbon carboxylic acid having from 2 to 7 carbon atoms with an enolic A-nor-B-homo5ξ,10ξ-estrane-3,6-dione of the formula:

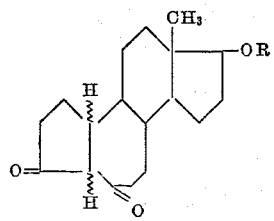

wherein R represents a radical selected from the group consisting of hydrogen and the acyl radical of an organic hydrocarbon carboxylic acid having from 2 to 7 carbon atoms, selected from the group consisting of the Δ³⁽⁵⁾ enol and the Δ⁵⁽⁶⁾ enol.

4. 17β-acetoxy-A-nor-B-homo-5ξ,10ξ-estrane-3,6 - dione in its enolic A form having a melting point of 168° C., a specific rotation $[\alpha]_D^{20} = +50°$ (c.=0.5% in chloroform), and an ultra-violet spectrum in ethanol:

$$\lambda_{max.} = 290 \text{ m}\mu, \quad E_{1\text{ cm.}}^{1\%} = 263$$

5. 17β-acetoxy-A-nor-B-homo-5ξ,10ξ-estrane-3,6 - dione in its enolic B form having a melting point of around 240° C. and an ultra-violet spectrum in ethanol:

$$\lambda_{max.} = 302 \text{ m}\mu, \quad E_{1\text{ cm.}}^{1\%} = 293$$

6. The mono-enol acetate of the enolic form A of 17β-acetoxy-A-nor-B-homo-5ξ,10ξ-estrane-3,6-dione having a melting point of 118° C., a specific rotation $$[\alpha]_D^{20} = 0° \pm 4°$$

(c.=0.5% in chloroform), and in infra-red spectrum showing a band at 1210 cm.⁻¹ and at 1200 cm.⁻¹ in accord with an enol acetate group and a band at 1765 cm.⁻¹ in accord with a carbonyl group.

7. A-nor-B-homo-5ξ,10ξ-estrane-17β-ol-3,6-dione in its enolic form having a melting point of 138–140° C. and an infra-red spectrum showing bands at 1649 cm.⁻¹ and at 1610 cm.⁻¹ in accord with two carbonyl groups and a band in accord with a hydroxyl group.

8. 17β-acetoxy-5ξ-methyl - A-nor-B-homo-10ξ-estrane-3,6-dione having a melting point of 164° C., a specific rotation $[\alpha]_D^{20} = +9°$ (c.=0.5% in chloroform) and an infra-red spectrum showing bands at 1740 cm.⁻¹ and at 1245 cm.⁻¹ in accord with an acetate group, bands at 1758 cm.⁻¹ and at 1699 cm.⁻¹ in accord with two carbonyl groups and no band in accord with a hydroxyl group.

9. The process of preparing an enolic A-nor-B-homo-5ξ,10ξ-estrane-3,6-dione of the formula:

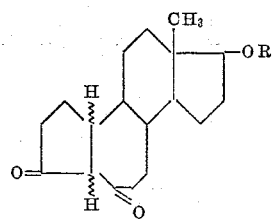

wherein R represents a radical selected from the group consisting of hydrogen and the acyl radical of an organic hydrocarbon carboxylic acid having from 2 to 7 carbon atoms, selected from the group consisting of the Δ³⁽⁵⁾ enol and the Δ⁵⁽⁶⁾ enol which comprises the steps of subjecting an A-nor-B-homo-Δ⁵⁽¹⁰⁾-estrene-3,6-dione having the formula:

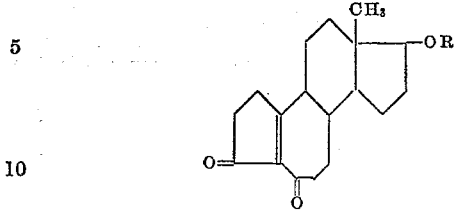

wherein R has the above assigned meanings to the action of an alkali metal mixed hydride in the presence of a low molecular weight hydroxylated organic solvent in an acidic media at about room temperature and recovering said enolic A-nor-B-homo-5ξ,10ξ-estrane-3,6-dione.

10. The process of claim 9 wherein said enolic A-nor-B-homo-5ξ,10ξ-estrane-3,6-dione is recovered in one of its enolic forms and is converted to the other of its enolic forms by heating with an aluminum lower alkanolate in an inert organic solvent.

11. The process of preparing an enol ester of an organic hydrocarbon carboxylic acid having from 2 to 7 carbon atoms with an enolic A-nor-B-homo-5ξ,10ξ-estrane-3,6-dione of the formula:

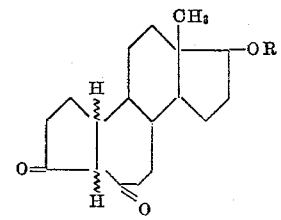

wherein R represents a radical selected from the group consisting of hydrogen and the acyl radical of an organic hydrocarbon carboxylic acid having from 2 to 7 carbon atoms, selected from the group consisting of the Δ³⁽⁵⁾ enol and the Δ⁵⁽⁶⁾ enol which comprises the steps of subjecting an A-nor-B-homo-Δ⁵⁽¹⁰⁾-estrene-3,6-dione having the formula:

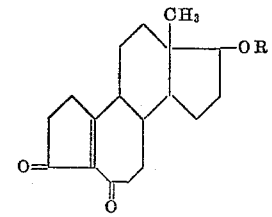

wherein R has the above assigned meanings to the action of an alkali metal mixed hydride in the presence of a low molecular weight hydroxylated organic solvent in an acidic media at about room temperature, subjecting said enolic A-nor-B-homo - 5ξ,10ξ - estrane-3,6-dione to the action of an esterifying derivative of an organic hydrocarbon carboxylic acid having from 2 to 7 carbon atoms under esterifying conditions and recovering said enol ester.

12. The process of preparing a 5ξ-lower alkyl-A-nor-B-homo-10ξ-estrane-3,6-dione having the formula:

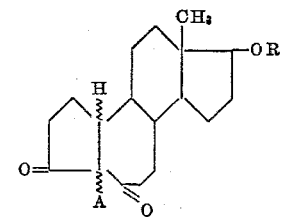

wherein R represents a radical selected from the group consisting of hydrogen and the acyl radical of an organic hydrocarbon carboxylic acid having from 2 to 7 carbon atoms and A represents a lower alkyl radical which comprises the steps of subjecting an A-nor-B-homo-$\Delta^{5(10)}$-estrene-3,6-dione having the formula:

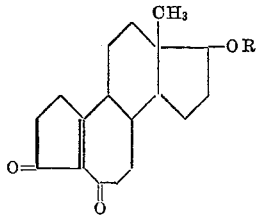

wherein R has the above assigned meanings to the action of an alkali metal mixed hydride in the presence of a low molecular weight hydroxylated organic solvent in an acidic media at about room temperature, reacting the enolic A-nor-B-homo-5$\xi$,10$\xi$-estrane-3,6-dione having the formula:

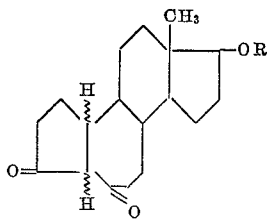

wherein R has the above assigned meanings with a lower alkyl halide in the presence of a basic condensation agent and recovering said 5$\xi$-lower alkyl-A-nor-B-homo-10$\xi$-estrane-3,6-dione.

No references cited.

UNITED STATES PATENT OFFICE
CERTIFICATE OF CORRECTION

Patent No. 3,061,636            October 30, 1962

Georges Muller et al.

It is hereby certified that error appears in the above numbered patent requiring correction and that the said Letters Patent should read as corrected below.

Column 2, line 21, strike out "form"; column 6, line 4, strike out "of", second occurrence; line 56, for "3,61-dione" read -- 3,6-dione --; column 7, line 3, for "291" read -- 293 -- line 13, for "-Nor-Homo-", in italics, read -- -Nor-B-Homo- -- in italics; columns 7 and 8, Table III, opposite "Testosterone acetate" and under the heading "Ith", for "10.0" read -- 0.10 --; column 8, line 70, for "-nor-B-" read -- -nor-B-homo- --; column 9, line 41, for "dion" read -- dione --; colu 11, line 40, for "in" read -- an --.

Signed and sealed this 30th day of April 1963.

(SEAL)
Attest:

ERNEST W. SWIDER
Attesting Officer

DAVID L. LADD
Commissioner of Patents